United States Patent

Ono

Patent Number: 6,078,020
Date of Patent: *Jun. 20, 2000

[54] APPARATUS AND METHOD FOR MANUFACTURING SEMICONDUCTOR DEVICE

[75] Inventor: Fuminobu Ono, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/970,146

[22] Filed: Nov. 13, 1997

[30] Foreign Application Priority Data

Nov. 19, 1996 [JP] Japan .................................. 8-308485

[51] Int. Cl.⁷ ........................................... B23K 1/00
[52] U.S. Cl. .................... 219/85.15; 219/85.14; 438/106
[58] Field of Search ................ 219/85.1, 85.14, 219/85.15, 85.18, 85.22, 85.19; 29/840, 843, 860; 438/106, 121, 469, 470

[56] References Cited

U.S. PATENT DOCUMENTS

| | | | |
|---|---|---|---|
| 2,813,191 | 11/1957 | Gray | 219/85.1 |
| 3,197,608 | 7/1965 | Ingraham | 219/85.15 |
| 3,660,632 | 5/1972 | Leinkram | 29/840 |
| 3,790,738 | 2/1974 | Laub et al. | 219/85.14 |
| 4,322,599 | 3/1982 | Cardinal | 219/119 |
| 4,389,557 | 6/1983 | Devenyi et al. | 219/85.14 |
| 4,506,139 | 3/1985 | Daughton | 219/85.1 X |
| 4,817,849 | 4/1989 | Yamamoto et al. | 219/85.1 X |
| 5,262,355 | 11/1993 | Nishiguchi et al. | 438/106 |
| 5,410,807 | 5/1995 | Bross et al. | 29/843 |
| 5,996,222 | 12/1999 | Shangguan et al. | 29/840 |

FOREIGN PATENT DOCUMENTS

| | | | |
|---|---|---|---|
| 819933 | 8/1969 | Canada | 219/85.14 |
| 160089 | 4/1983 | German Dem. Rep. | |
| 1218066 | 6/1966 | Germany | 219/85.15 |
| 45-37657 | 11/1970 | Japan | 219/85.15 |
| 54-110786 | 8/1979 | Japan | |
| 60-177636 | 9/1985 | Japan | |
| 5-267362 | 10/1993 | Japan | |
| 7-202088 | 8/1995 | Japan | |
| 727350 | 4/1980 | U.S.S.R. | 219/85.22 |

*Primary Examiner*—Geoffrey S. Evans
*Attorney, Agent, or Firm*—Foley & Lardner

[57] ABSTRACT

In semiconductor device manufacturing apparatus and method, in a joining process of a semiconductor pellet (2) and a package (1), the semiconductor pellet (2) is kept to a temperature equilibrium state under an actual use temperature condition while a low melting-point soldering member (3) is interposed between the semiconductor pellet (2) and the package (1), and the electrode pads (9) on the upper surface of the semiconductor pellet (2) and the electrode terminals (8) of the collet (5), which is electrically connected to the output terminal of a high voltage electric pulse source (4), are fitted and electrically connected to each other. Subsequently, a high voltage electric pulse is produced in the high voltage electric pulse source (4) and applied to the electrode pads (9) to melt the low melting-point soldering member (3), causing joining of the package (1) and the semiconductor pellet (2). The joining treatment can be performed under the actual use temperature condition of the semiconductor pellet (2), and thermal stress to the semiconductor pellet (2) is suppressed and the lifetime of the semiconductor pellet (2) can be increased.

17 Claims, 2 Drawing Sheets

ELECTRIC PULSE SOURCE

APPARATUS AND METHOD FOR MANUFACTURING SEMICONDUCTOR DEVICE

BACKGROUND OF THE INVENTION

1. Field of the Invention

The present invention relates to an apparatus and a method for manufacturing a semiconductor device, and particularly a semiconductor device manufacturing apparatus and a semiconductor device manufacturing method used when a semiconductor pellet or semiconductor chip is joined to a package.

2. Description of Related Art

FIG. 1 is a schematic cross-sectional view showing the conventional semiconductor device manufacturing apparatus and method used for joining the semiconductor pellet or semiconductor chip to the package. In a conceptual construction of a system shown in FIG. 1, reference numeral 1 denotes a package, 2 a semiconductor pellet, 3 a low-melting point soldering member, 7 a metallized surface layer of the semiconductor pellet, and 10 a heater.

According to the conventional semiconductor device manufacturing apparatus and method, during a joining process, the semiconductor pellet 2 and the package 1 are joined to each other as follows. That is, as shown in FIG. 1, the semiconductor pellet, 2 is mounted on the package 1, and the low melting-point soldering member 3 of AuSn or the like is heated by the heater 10. The low-melting point soldering member 3 is left while heated for a predetermined time under the condition that the temperature is fixed to about the melting point of the low-melting point soldering member 3 (for example, 320° C. in the case of AuSn), thereby joining the semiconductor pellet 2 to the package 1 by the melted low melting-point soldering member 3.

In such conventional semiconductor device manufacturing apparatus and method for joining the semiconductor pellet to the package, the semiconductor pellet 2 is heated and left at the melting point of the low melting-point soldering member 3 (for example, about 320° C.) at at least its joining surface to the package 1. This temperature under the joining process is higher than a temperature under the actual service condition of the semiconductor pellet (for example, about 130° C. in the case of FET or the like). Accordingly, stress is applied to the semiconductor pellet 2 by the low melting-point soldering member 3 and the package 1 due to the difference between the temperature condition in the joining process and the temperature condition at the actual use time of the semiconductor device and the difference in thermal expansion coefficient between associated parts, and this reduces the lifetime of the semiconductor pellet 2.

SUMMARY OF THE INVENTION

An object of the present invention is to provide a semiconductor device manufacturing apparatus and a semiconductor device manufacturing method that suppress the effect of stress to be applied to a semiconductor pellet in a joining process of the semiconductor pellet to a package to enhance the lifetime of the semiconductor pellet and semiconductor device.

In order to attain the above object, according to a first aspect of the present invention, there is provided a semiconductor device manufacturing apparatus for use in joining a semiconductor pellet to a package, comprising a collet; an electrode terminal provided on a surface of the collet with which the semiconductor pellet comes in contact when the joining; and an electric pulse source for supplying an electric pulse to the electrode terminal.

In apparatus, when the joining, the electric pulse produced by the electric pulse source is supplied to an electrode pad formed on one surface of the semiconductor pellet via the electrode terminal, then to another surface of the semiconductor pellet via an electrically conductive member of the semiconductor pellet, then to a soldering member interposed between the semiconductor pellet and the package, so that the soldering member is melted to join the semiconductor pellet to the package.

Further, according to a second aspect of the present invention, there is provided a semiconductor device manufacturing method for use in joining a semiconductor pellet to a package, comprising:

a step of mounting the semiconductor pellet on the package while a solder is interposed between the semiconductor pellet and the package, and keeping a temperature lower than an actual use temperature of the semiconductor pellet;

a step of fitting to the semiconductor pellet a face of a collet confronting the semiconductor pellet and setting an electrode pad of the semiconductor pellet and the electrode terminal of the collet to be electrically connected to each other; and a step of applying an electric pulse for melting the solder through the electrode terminal of the collet, the electrode pad of the semiconductor pellet and an electrically conductive member of the semiconductor pellet to electrically heat and melt the solder interposed between the semiconductor pellet and the package, thereby joining the semiconductor pellet to the package.

Still further, according to a third aspect of the present invention, there is provided a semiconductor device manufacturing method for use in joining a semiconductor pellet to a package, comprising:

a step of mounting a first semiconductor pellet on the package while a solder is interposed between the first semiconductor pellet and the package, and keeping a temperature lower than an actual use temperature of the semiconductor pellet;

a step of fitting to the first semiconductor pellet a face of a collet confronting the first semiconductor pellet and setting an electrode pad of the first semiconductor pellet and the electrode terminal of the collet to be electrically connected to each other;

a step of applying an electric pulse for melting the solder through the electrode terminal of the collet, the electrode pad of the first semiconductor pellet and an electrically conductive member of the first semiconductor pellet to electrically heat and melt the solder interposed between the first semiconductor pellet and the package, thereby joining the first semiconductor pellet to the package; and a step of performing the above three steps in which each of a second to n-th semiconductor pellets (n represents an integer equal to or greater than 2) is employed instead of the first semiconductor pellet to join the second to n-th semiconductor pellets to the package.

In the methods, the electrically conductive member of the semiconductor pellet may comprise a via hole and/or a metallized surface layer of the semiconductor pellets.

According to the present invention, the low melting-point soldering member is melted with a high voltage electric pulse having an extremely short pulse width to join the semiconductor pellet and the package, so that it is unnecessary to perform the joining treatment under the temperature condition where the semiconductor pellet and the package are left at the melting-point of the low melting-point soldering member, and the joining treatment can be performed by subjecting only the area around the low melting-point soldering member to the heat treatment. Accordingly, the stress imposed between the members due to the difference between the joining temperature condition and the actual use temperature condition can be suppressed, and the lifetime characteristic of the semiconductor pellet and the semiconductor device can be improved.

Further, by melting the low melting-point soldering member with a high voltage electric pulse, the package and the semiconductor pellent can be joined to each other under the temperature condition, which is lower than the melting-point temperature with imposing no restriction on the melting-point temperature of the low melting-point soldering member.

DETAILED DESCRIPTION OF THE PREFERRED EMBODIMENTS

Preferred embodiments according to the present invention will be hereunder described with reference to the accompanying drawings.

Figure 1:
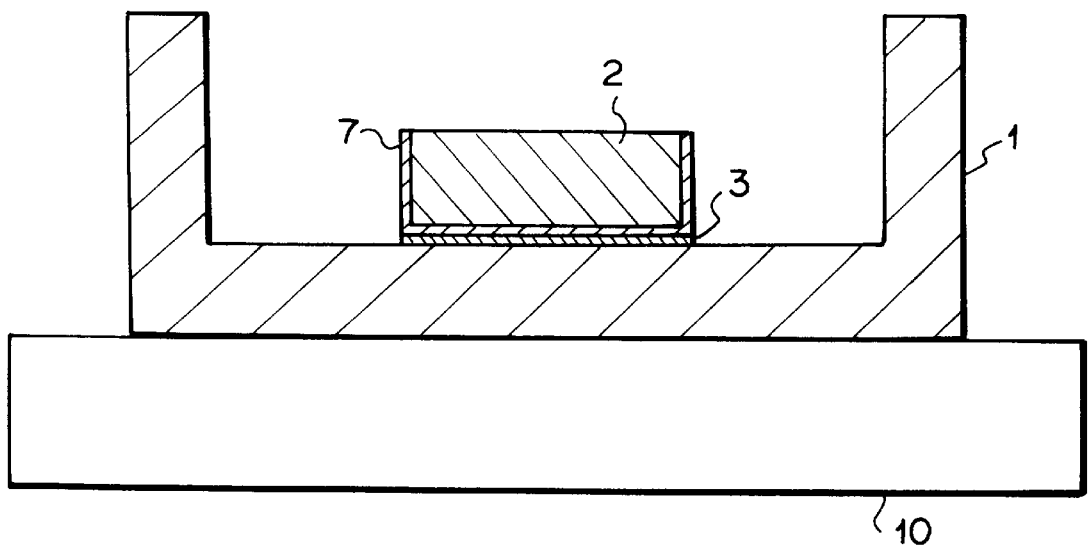
FIG. 1 is a schematic cross-sectional view showing a semiconductor pellet, associated members and associated instruments in the conventional apparatus and method for manufacturing semiconductor device.
Figure 2:
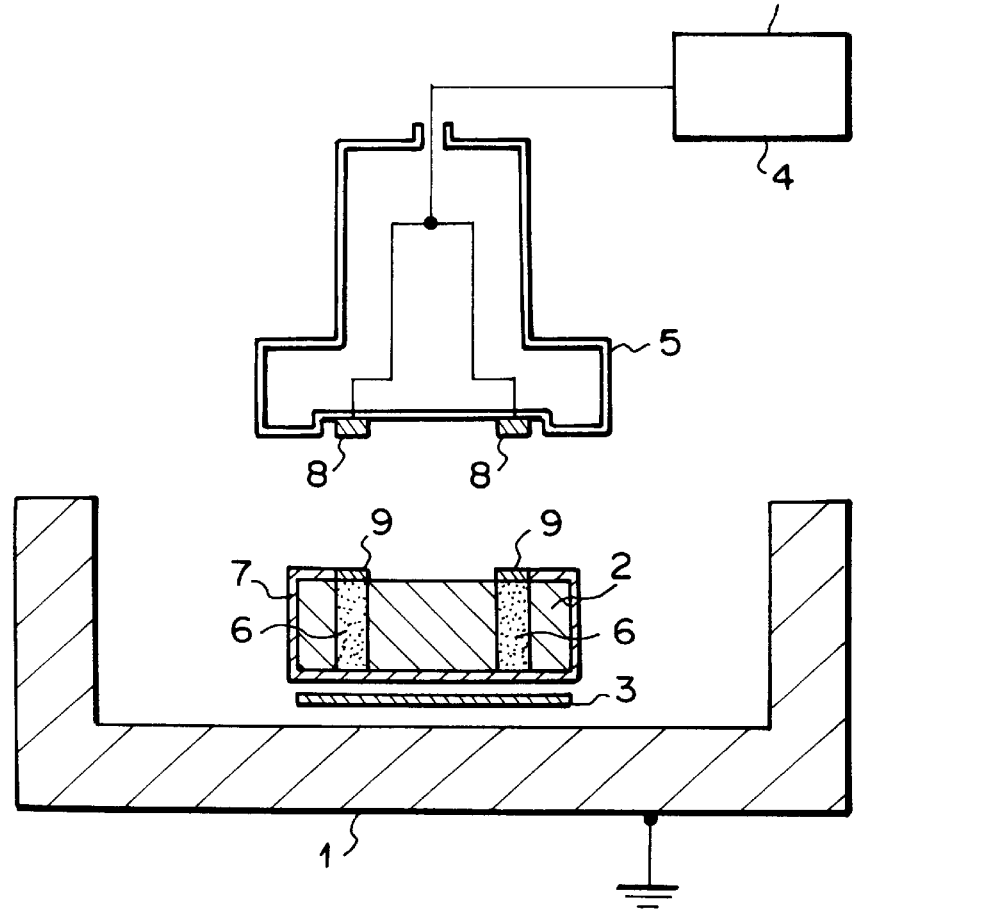
FIG. 2 is a schematic cross-sectional view showing a semiconductor pellet, associated members and associated instruments in a first embodiment of the present invention.

FIG. 2 is a schematic cross-sectional view showing the construction of a first embodiment of the present invention when a package and a semiconductor pellet are joined to each other, and shows the positional relationship of a package 1, a semiconductor pellet 2, a low melting-point soldering member (solder) 3 used for the semiconductor pellet 2, a via hole 6, a metallized surface layer 7 of the semiconductor pellet 2, an electrode pad 9 formed on the upper surface of the semiconductor pellet 2, a high-voltage electric pulse source 4, and a collet 5 provided with electrode terminals 8. The collet 5 can hold the semiconductor pellet 2 by means of vacuum.

The operation and the procedure in the joining process of the package 1 and the semiconductor pellet 2 according to this embodiment will be hereunder described.

In FIG. 2, the semiconductor pellet 2 is mounted on the package 1 while the low melting-point soldering member 3, for example a low melting-point solder made of AuSn or the like as in the case of the prior art, is interposed therebetween. In this state, the semiconductor pellet 2 is left for a fixed time at a temperature of its actual use condition, and kept to the temperature equilibrium state under the actual use temperature condition by means of a heater (not shown).

The semiconductor pellet 2 is provided with the via hole 6 and/or the metallized surface layer 7 (FIG. 2 shows the case where both the via hole 6 and the metallized surface layer 7 are formed), and the electrode pads 9 on the pellet surface and the back surface of the semiconductor pellet are electrically connected to each other by the via hole 6 and/or the metallized surface layer 7.

Further, the collet 5 which, is electrically connected to the output terminal of the high-voltage electric pulse source 4, is provided with the electrode terminals 8 on the lower surface thereof confronting the upper surface of the semiconductor pellet 2. The electrode terminals 8 are positioned corresponding to the electrode pads 9 on the pellet surface. The electrode terminals 8 are electrically connected to the output terminal of the high-voltage electric pulse source 4. The collet 5 itself is also likewise heated and kept at the actual use temperature of the semiconductor pellet 2 by means of the heater. In this case, the package 1 is kept to the ground potential.

Figure 3:
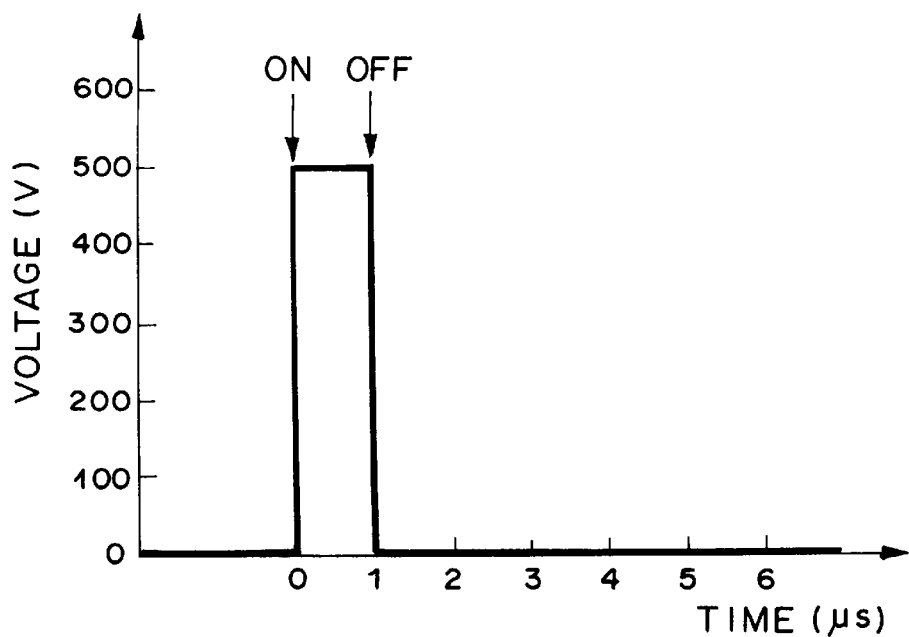
FIG. 3 is a diagram showing a waveform of a high voltage electric pulse.

As the procedure of joining the semiconductor pellet 2 to the package 1, the lower surface of the collet 5 confronting the semiconductor pellet 2 is fitted to the upper surface of the semiconductor pellet 2 so that the electrode pads 9 of the semiconductor pellet 2 and the electrode terminals 8 of the collet 5 are electrically connected to each other. Subsequently, a high-voltage electric pulse (for example, voltage of 500 V, current of 20 mA, pulse width of 1.0 $\mu$sec as shown in FIG. 3), which is produced by actuating the high-voltage electric pulse source 4, is applied to the electrode pads 9 of the semiconductor pellet 2 by the electrode terminals 8 of the collet 5, and conducted through the metallized surface layer 7 and/or via holes 6 of the semiconductor pellet 2 to the low melting-point soldering member 3 which is interposed between the package 1 and the semiconductor pellet 2, thereby electrically heating and melting the low melting-point soldering member 3. Therefore, only an area around the low melting-point soldering member 3 is locally heated to cause the melting of the soldering member 3 so as to effectively join the package 1 and the semiconductor element 2.

In the above apparatus and method, the collet 5 can hold the semiconductor pellet 2 with the above-mentioned positional relationship and transport it to the position for the joining.

Accordingly, in the apparatus and method for joining the package 1 and the semiconductor pellet 2 according to this embodiment, as the low melting-point soldering member 3 is melted with the high-voltage electric pulse having an extremely short pulse width and the semiconductor pellet 2 and the package 1 can be effectively joined to each other by heating only the area around the low melting-point soldering member 3, it is unnecessary in the joining procedure of the package 1 and the semiconductor pellet 2 to employ the conventional temperature condition under which the semiconductor pellet 2 is also heated to the melting point of the low melting-point soldering member 3. Accordingly, occurrence of stress between members on the actual use of the semiconductor device due to the difference between the joining temperature condition and the actual use temperature condition of the semiconductor pellet 2 can be suppressed, and the lifetime of the semiconductor device can be increased. Further, the low melting-point soldering member 3 is melted by the high voltage electric pulse to join the semiconductor pellet 2 and the package 1, so that the package 1 and the semiconductor pellet 2 are left under any temperature conditions during the joining while keeping the temperature equilibrium state thereof. Therefore, the semiconductor pellet 2 can be joined to the package 1 under a temperature condition thereof which is lower than the melting-point of the low melting-point soldering member 3 with no restriction on the melting point of the low melting-point soldering member 3.

Next, a second embodiment according to the present invention will be described.

Figure 4:
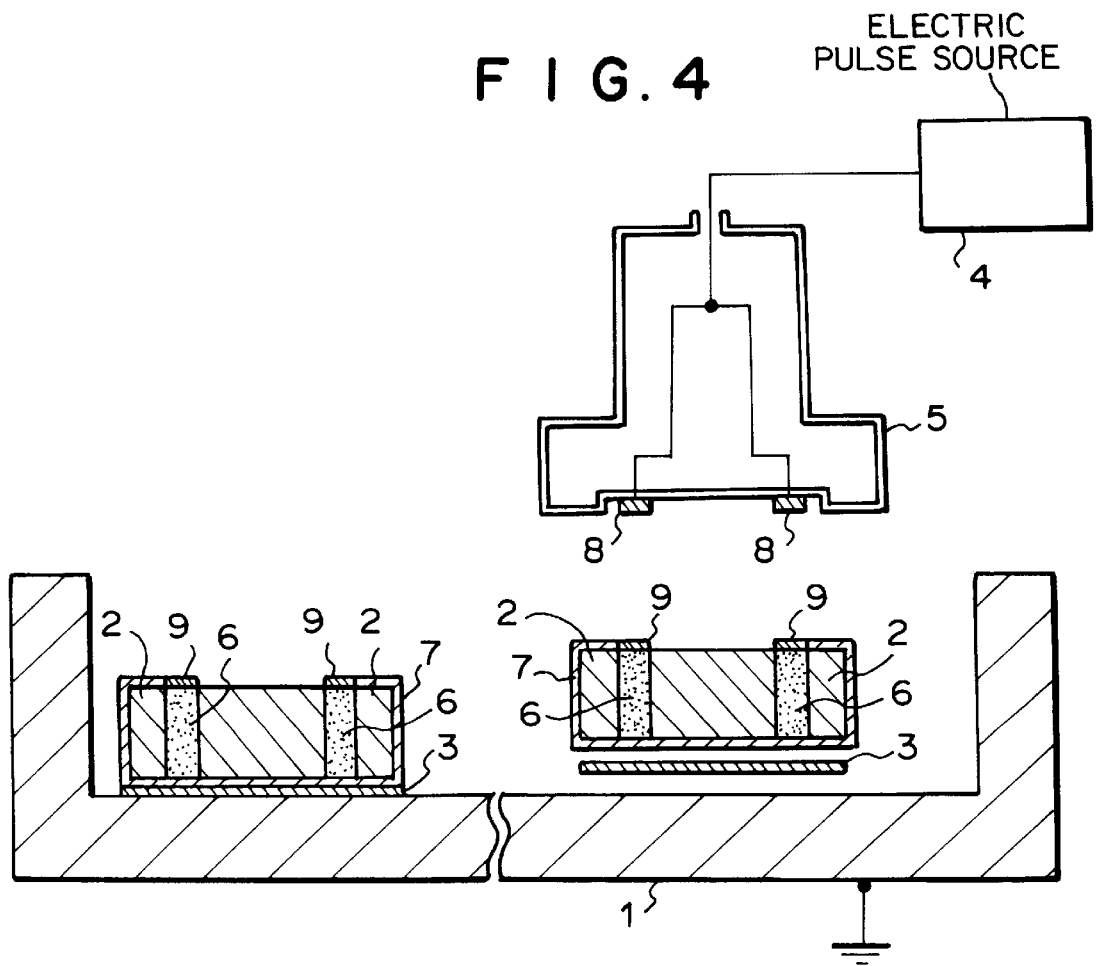
FIG. 4 is a schematic cross-sectional view showing a semiconductor pellet, associated members and associated instruments in a second embodiment of the present invention.

FIG. 4 is a schematic cross-sectional view showing the construction of the second embodiment of the present invention when a package and a semiconductor pellet are joined to each other, and shows the positional relationship of a package 1, a plurality of semiconductor pellets 2, low melting-point soldering members 3 that individually correspond to the respective semiconductor pellets, via holes 6, metallized surfaces 7 of the semiconductor pellets 2, electrode pads 9, a high-voltage electric pulse source 4 and an a collet having electrode terminals 8 as in the case of the first embodiment.

This embodiment differs from the first embodiment in that a process of individually and successively joining each of the plurality of semiconductor pellets 2 to the package 1 by means of the collet 5 is used. The joining process between the package 1 and each semiconductor pellet 2 is the same as the first embodiment. In this embodiment, since the process of individually and successively joining each of plural semiconductor pellets 2 to the package 1 is used, when the semiconductor pellet 2 is joined to the package 1, the joining treatment is performed while keeping the semiconductor pellet thermally independent from other semiconductor pellets, avoiding such a situation where due to the joining treatment, new thermal stress is applied to the other semiconductor pellets 2 that have been already joined to the package 1, so that the plural semiconductor pellets 2 and the package 1 can be smoothly joined to each other.

It is needless to say that as in the case of the first embodiment, occurrence of stress between members on the actual use of the semiconductor device due to the difference between the joining temperature condition and the actual use temperature condition of the semiconductor pellets 2 can be suppressed, and the lifetime characteristic of the semiconductor pellets 2 and the semiconductor device can be improved. In addition, the low melting-point soldering member 3 is melted by the high voltage electric pulse to join the semiconductor pellet 2 and the package 1, so that the package 1 and the semiconductor pellet 2 are left under any temperature conditions during the joining treatment while keeping the temperature equilibrium state thereof.

What is claimed is:

1. A semiconductor device manufacturing apparatus for joining a semiconductor pellet to a package using a solder, the semiconductor pellet having an electrode pad on one surface side thereof and an electrically conductive member extending from the electrode pad to another surface side, which is opposite the one surface side, comprising:

a collet having a surface with an electrode terminal, wherein the collet is movable so that the electrode terminal comes in contact with the electrode pad on the semiconductor pellet when joining the semiconductor pellet to the package; and an electric pulse source that supplies an electric pulse to the electrode terminal, wherein the electric pulse is supplied to the electrode pad and to the electrically conductive member through the electrode terminal, the electric pulse supplied to the electrically conductive member conducts through the solder interposed between the electrically conductive member and the package and melts the solder to join the semiconductor pellet to the package, while maintaining the semiconductor pellet to a temperature lower than an actual use temperature of the semiconductor pellet.

2. A semiconductor device manufacturing apparatus according to claim 1, wherein the collet holds the semiconductor pellet with a vacuum.

3. A semiconductor device manufacturing apparatus according to claim 1, wherein the conductive member is a metallized surface layer formed on the semiconductor pellet surfaces extending from the electrode pad to the another surface side.

4. A semiconductor device manufacturing apparatus according to claim 1, wherein the conductive member is a via hole formed through the semiconductor pellet and filled with an electric conductive material.

5. A semiconductor device manufacturing apparatus according to claim 1, wherein the electric pulse conducts to the package.

6. A semiconductor device manufacturing apparatus according to claim 1, wherein the package is kept at a ground potential.

7. A semiconductor device manufacturing method for joining a semiconductor pellet to a package, comprising:

providing a semiconductor pellet having an electrode pad on one surface side thereof and an electrically conductive member extending from the electrode pad to another surface side, which is opposite the one surface side;

positioning a solder on one surface side of the package and the semiconductor pellet on the solder, with the electrically conductive member contacting the solder;

maintaining a temperature of the semiconductor pellet lower than an actual use temperature thereof;

providing a collet having a surface with an electrode terminal, and contacting the electrode terminal with the electrode pad on the semiconductor pellet; and supplying an electric pulse to the electrode terminal and supplying the electric pulse to the solder through the electric pad and the conductive member so that the electric pulse conducts through the solder and melts the solder to join the semiconductor pellet to the package, while maintaining the semiconductor pellet to a temperature lower than an actual use temperature of the semiconductor pellet.

8. A semiconductor device manufacturing method according to claim 7, wherein the conductive member is a metallized surface layer formed on the semiconductor pellet surfaces extending from the electrode pad to the another surface side.

9. A semiconductor device manufacturing method according to claim 7, wherein the conductive member is a via hole formed through the semiconductor pellet and filled with an electric conductive material.

10. A semiconductor device manufacturing method according to claim 7, providing a plurality of semiconductor pellets and repeating the positioning and heating step for each of the semiconductor pellets.

11. A semiconductor device manufacturing method according to claim 7, wherein the electric pulse conducts to the package.

12. A semiconductor device manufacturing method according to claim 7, wherein the package is kept at a ground potential.

13. A semiconductor device manufacturing system comprising:

a package;

a semiconductor pellet having an electrode pad on one surface side thereof and an electrically conductive member extending from the electrode pad to another surface side, which is opposite the one surface side;

a solder positioned between the package and the semiconductor pellet, with the electrically conductive member contacting the solder;

a collet having a surface with an electrode terminal, and the collect being movable to contact the electrode terminal with the electrode pad on the semiconductor pellet; and an electric pulse source that supplies an electric pulse to the electrode terminal and thus to the solder through the electric pad and the conductive member so that the electric pulse conducts through the solder and melts the solder to join the semiconductor pellet to the package, while maintaining the semiconductor pellet to a temperature lower than an actual use temperature of the semiconductor pellet.

14. A semiconductor device manufacturing system according to claim 13, wherein the conductive member is a metallized surface layer formed on the semiconductor pellet surfaces extending from the electrode pad to the another surface side.

15. A semiconductor device manufacturing apparatus according to claim 14, wherein the conductive member is a via hole formed through the semiconductor pellet and filled with an electric conductive material.

16. A semiconductor device manufacturing system according to claim 13, wherein the electric pulse conduct to the package.

17. A semiconductor device manufacturing system according to claim 13, wherein the package is kept at a ground potential.

* * * * *